United States Patent [19]

Doak et al.

[11] Patent Number: 4,760,648

[45] Date of Patent: Aug. 2, 1988

[54] MARKING DEVICE

[76] Inventors: Sid W. Doak, 1301 Country Club Dr., McCook, Nebr. 69001; Shawn P. Suiter, 2209 Jones St., Omaha, Nebr. 68102

[21] Appl. No.: 920,767

[22] Filed: Oct. 20, 1986

[51] Int. Cl.$^4$ ............................................. G01B 3/10
[52] U.S. Cl. ........................................ 33/668; 33/138
[58] Field of Search ................ 33/189, 138, 139, 140, 33/27.03, 666, 668

[56] References Cited

U.S. PATENT DOCUMENTS

| | | | |
|---|---|---|---|
| 2,807,886 | 10/1957 | Aciego | 33/668 |
| 3,262,211 | 7/1966 | Beckett | 33/189 |
| 3,336,678 | 8/1967 | Chamberlain et al. | 33/189 |
| 3,479,742 | 11/1969 | Starkenberg | 33/138 |
| 3,731,389 | 5/1973 | King | 33/138 |
| 3,802,083 | 4/1974 | Freed | 33/189 |
| 4,015,337 | 4/1977 | Taylor | 33/189 |
| 4,296,554 | 10/1981 | Hammerstrom | 33/189 |

Primary Examiner—William A. Cuchlinski, Jr.
Assistant Examiner—Patrick R. Scanlon
Attorney, Agent, or Firm—Zarley, McKee, Thomte, Voorhees & Sease

[57] ABSTRACT

A marking device is described which is adapted to be mounted on one side of a tape measure which is comprised of a tape housing having a measuring tape coiled therein for extension therefrom through a tape issuing opening. The marking device comprises a support which is secured to one side of the tape measure housing and which extends forwardly therefrom. An elongated upstanding tubular housing is positioned on the forward end of the support with the lower end of a tubular housing being positioned laterally of the tape issuing opening. A marking member is selectively vertically mounted in the tubular housing which is adapted to be moved downwardly into marking contact with the article being measured.

2 Claims, 2 Drawing Sheets

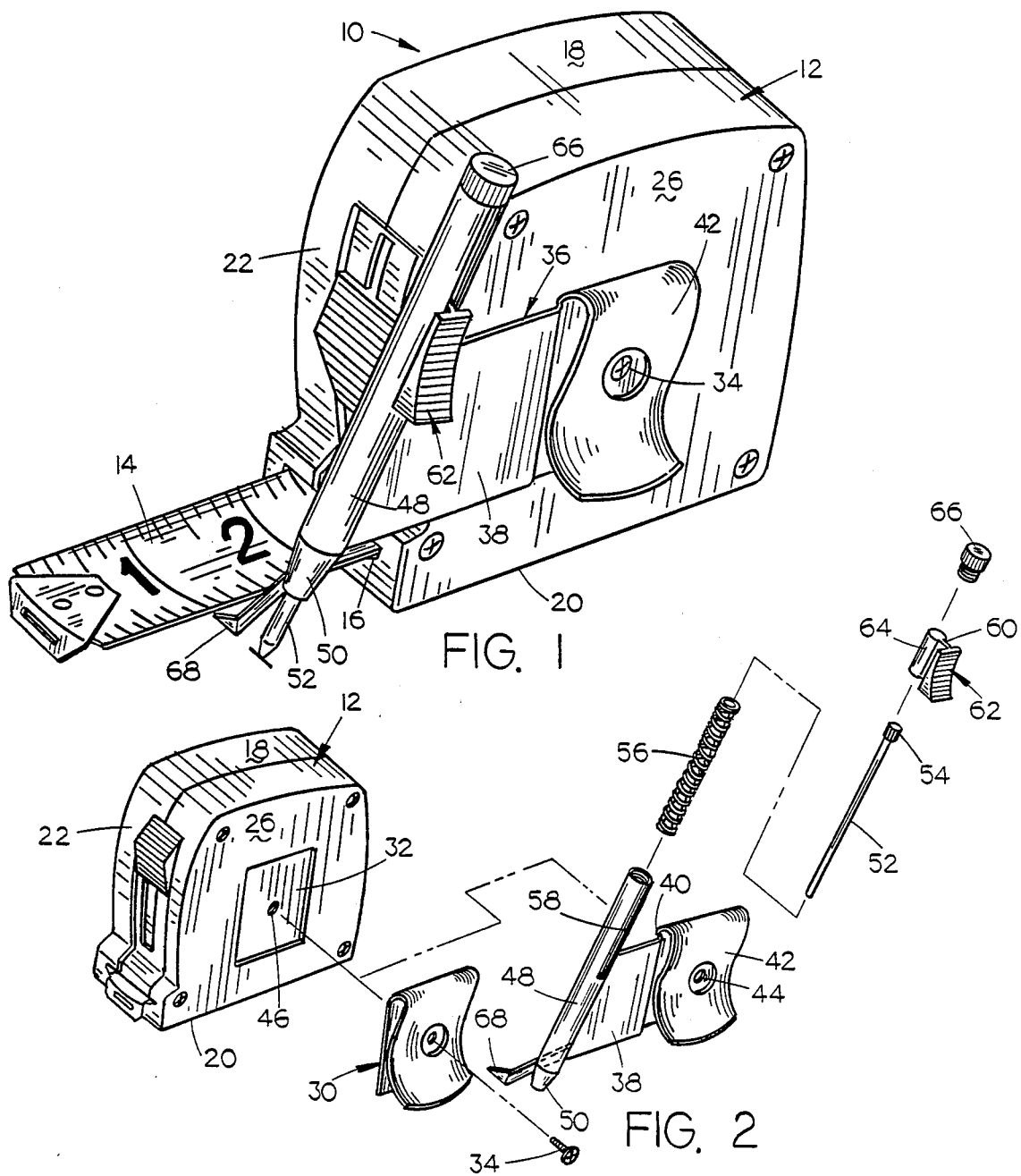
FIG. 1
FIG. 2
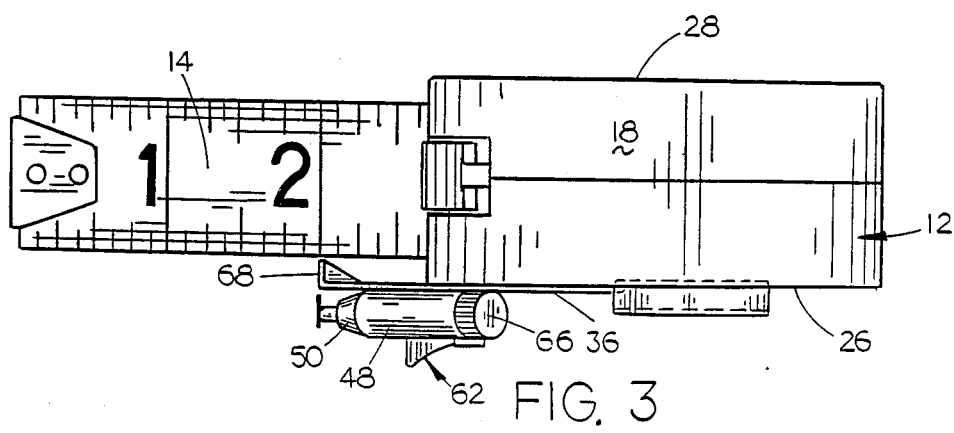
FIG. 3

MARKING DEVICE

BACKGROUND OF THE INVENTION

Many types of marking devices have been provided for use with tape measures which are comprised of a coiled tape positioned within a housing. Conventional tape measures normally comprise a tape housing having a measuring tape coiled therein. The tape may be uncoiled or extended from the housing to measure articles such as lumber or the like. Normally, a carpenter will pull the tape measure in one hand and will mark the article being measured with a pencil or the like held in his other hand. The marking devices of the prior art were designed to incorporate a marking device on a tape measure so that the carpenter could conveniently mark the article being measured.

The devices of the prior art are believed to be too expensive to be practical or are so cumbersome to use as to be impractical.

BRIEF DESCRIPTION OF THE DRAWINGS

FIG. 1 is a perspective view of a conventional tape measure having the marking device of this invention mounted thereon:

FIG. 2 is an exploded perspective view of the marking device illustrating its relationship with the tape measure:

FIG. 3 is a top view of the device in use; and

SUMMARY OF THE INVENTION

Figure 4:
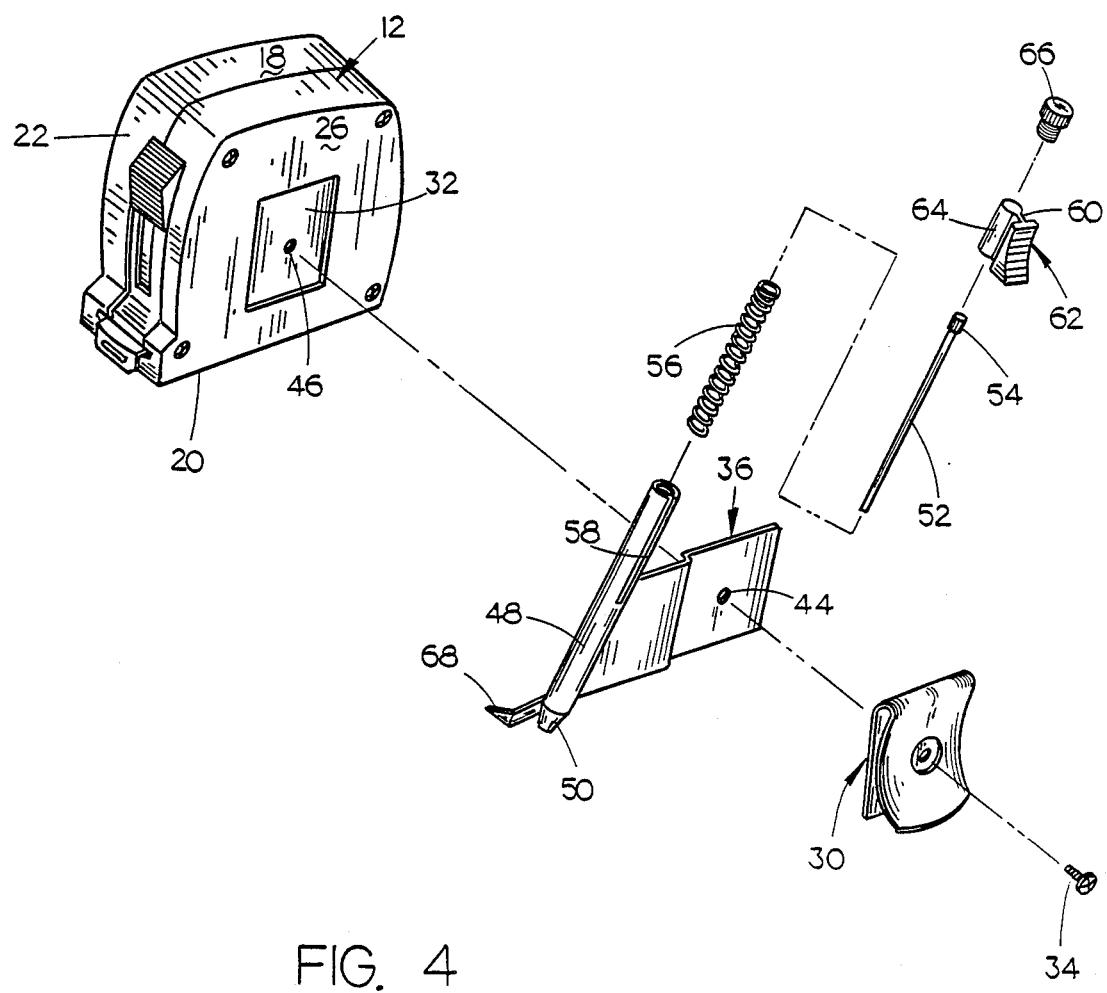
FIG. 4 is an exploded perspective view similar to FIG. 2 except that a modified form of the invention is illustrated.

A marking device is described which is adapted to be secured to the side of a conventional tape measure including a tape housing having a measuring tape coiled therein. The conventional tape housing normally has a spring belt clip mounted at one side thereof to enable the tape measure to be conveniently attached to the belt of a carpenter or the like. The instant invention comprises two versions of the marking device. In one version, the spring belt clip on the tape measure is removed and the marking device is mounted in its place. The marking device of this embodiment comprises a support which is positioned in the recessed area normally occupied by the spring clip belt. The support has a spring belt clip integrally formed therewith. At the forward end of the support is an upstanding tubular housing or barrel having a marking member vertically movably mounted therein. The vertically movably marking member may be lowered into engagement with the article being measured to appropriately mark the article. In the other version of the apparatus, the support means for the tubular housing is positioned between the side of the tape housing and the spring belt clip.

A principal object of the invention is to provide an improved marking device for a tape measure.

A further object of the invention is to provide a marking device for a tape measure which may be easily mounted on a conventional tape measure housing without modification thereof.

A further object of the invention is to provide a marking device for a tape measure which is convenient to use.

Still another object of the invention is to provide a marking device for a tape measure which enables a carpenter or the like to conveniently mark the article being measured.

Still another object of the invention is to provide a marking device for a tape measure which does not interfere with the normal use of the tape measure.

These and other objects will be apparent to those skilled in the art.

DESCRIPTION OF THE PREFERRED EMBODIMENT

In the drawings, the numeral 10 refers to a conventional tape measure comprising a tape housing 12 having a coiled measuring tape 14 positioned therein in conventional fashion and which may be pulled therefrom through opening 16 formed in housing 12. For purposes of description, tape housing 12 will be described as including an upper end 18, lower end 20, forward end 22, rearward end 24, and opposite sides 26 and 28. Tape measure 10 normally includes a spring belt clip 30 which is mounted in the recessed area 32 formed in side 26 of housing 12. As seen in the drawings, the spring belt clip 30 is normally maintained in the recessed opening 32 by means of screw 34. It is to this conventional structure that the marking device of this invention is attached.

The marking device of this invention is referred to generally by the reference numeral 36 in FIGS. 1, 2 and 3. The modified version of the marking device is illustrated in FIG. 4 and is referred to generally by the reference numeral 36'.

Marking device 36 includes a support means 38 having a protruding or shoulder portion 40 which is adapted to be received within the recessed area 32 when the spring belt clip 30 have been removed therefrom. Support means 38 is provided with a spring belt clip portion 42 as illustrated in FIG. 2. The marking device 36 is secured to the tape measure housing 12 by means of the screw 34 extending through the opening 44 and being received by the internally threaded opening 46.

An upstanding tubular housing or barrel 48 is mounted on the forward end of support means 38 and includes a tapered lower end 50 having an opening formed therein adapted to have the marking member 52 extend. Marking member 52 is positioned within housing 48 and has a sleeve 54 secured to the upper end thereof. Spring 56 embraces marking member 52 and the lower end of sleeve 54 engages the upper end of spring 56. The lower end of spring 56 engages the inside surface of a tapered portion 50. As seen in the drawings, housing 48 is provided with an elongated slot 58 at one side thereof which is adapted to receive the web 60 of thumb slide 62. Thumb slide 62 includes a cylindrical portion 64 which is adapted to be received within housing 48 as illustrated in the drawings. Screw 66 is threadably mounted in the upper end of the housing 48 as illustrated in the drawings to maintain the components therein.

When it is desired to mount the marking device 36 on the tape measure 10, spring belt clip 30 is removed from the housing 12 by removing the screw 34. Shoulder or protruding portion 40 of support means 38 is then positioned in the recessed area 32 and the screw 34 is reinserted and tightened.

When it is desired to measure and mark an article such as a piece of lumber or the like, the measuring tape 14 is pulled from the housing 12 in conventional fashion. Indicator means 68 extends laterally inwardly from the forward end of support means 38 to indicate to the user the exact location that the lower end of the marker member 52 will engage the article to be measured. When it is desired to mark the article, thumb slide 62 is moved downwardly with respect to housing 48 which causes the lower end of the marking member 52 to be moved into engagement with the article as illustrated in FIG. 1. As stated, indicator means 68 coincides with the lower end of the marking member 52. When the article has been marked, thumb slide 62 is released so that the spring 56 can move the marking member 52 upwardly with respect to the housing 48 and out of engagement with the article.

The modified version of the marking device is illustrated in FIG. 4 as previously stated. In the embodiment of 36' illustrated in FIG. 4, the support means 38' does not include the spring belt clip but simply includes a shoulder portion or protruding portion 40' which is adapted to be received within the recessed area 32 after the spring belt clip 30 has been removed. When the shoulder portion 40 has been positioned within the recessed area 32, spring belt clip 30 is positioned adjacent the outer side thereof and screw 34 is reinserted to not only maintain the marking device 36 on the tape measure but to also maintain spring belt clip 30 on the tape measure. The device of FIGS. 1-3 is essentially identical to the device of FIG. 4 except that in the device of FIG. 4, the spring belt clip 30 is utilized rather than providing a spring belt clip on the marking device.

It can therefore be seen that a novel marking device has been provided for a tape measure which is convenient to use and which may be mounted on a conventional tape measure without modification thereof.

We claim:

1. In combination,
a tape measure comprising a tape housing having a measuring tape coiled therein for extension therefrom through a tape-issuing opening, said housing having a top portion, bottom portion, forward end, rearward end, and opposite sides, said tape housing having a generally rectangular recessed area formed in one side thereof,
a marking device mounted on said housing for marking an article being measured,
said marking device comprising a support means secured within the recess in the side of said housing and extending forwardly therefrom, an elongated upstanding hollow tubular housing means positioned on the forward end of said support means and having upper and lower ends, the lower end of said tubular housing means being positioned laterally of said tape-issuing opening, the lower end of said tubular housing means having an opening formed therein, a marking member selectively vertically movably mounted in said tubular housing means, means for selectively vertically moving said marking member downwardly in said tubular housing means and through said opening in said tubular housing means so that the lower end of said marking member may be moved into marking contact with an article being measured, and means for moving said marking member upwardly in said tubular housing means so that said marking member is moved out of marking contact with an article being measured,
an indicator means rigidly affixed to said marking device support means, for indicating the relationship of the lower end of said marking member with respect to said measuring tape, and
a spring belt clip secured to said support means and said tape housing laterally of said recessed area and spaced away from said marking member.

2. The combination of claim 1 wherein said spring belt clip is integrally formed with said support means.

* * * * *